April 9, 1929.  W. T. BIRD  1,708,075
CORN CULTIVATOR ATTACHMENT
Filed Aug. 25, 1927
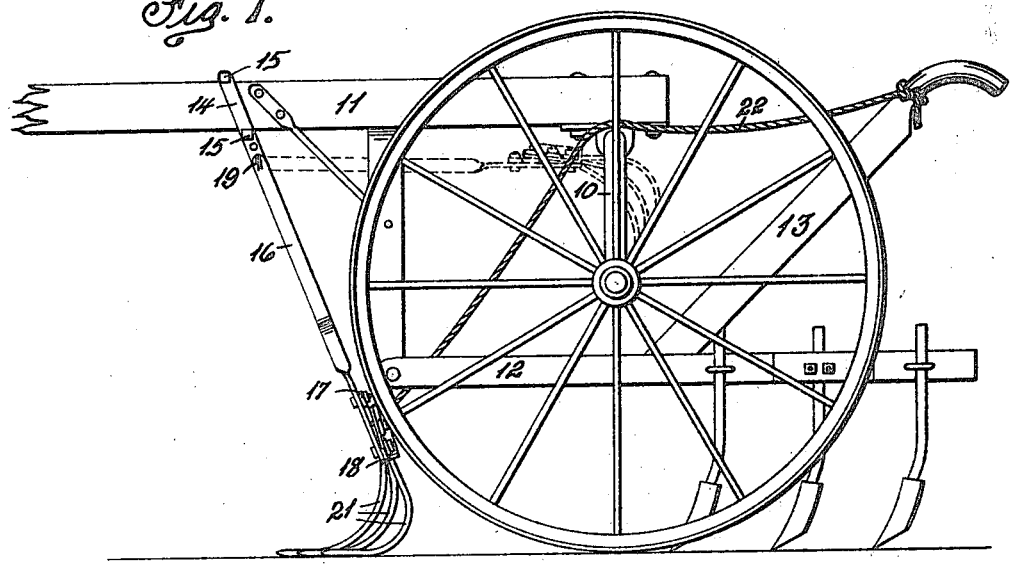
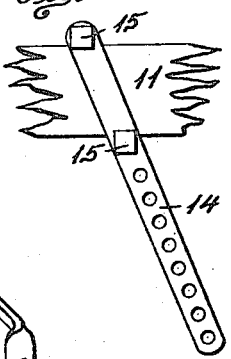
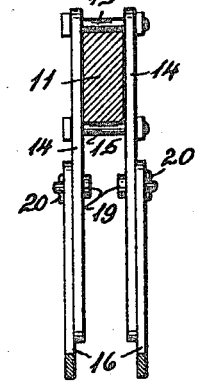
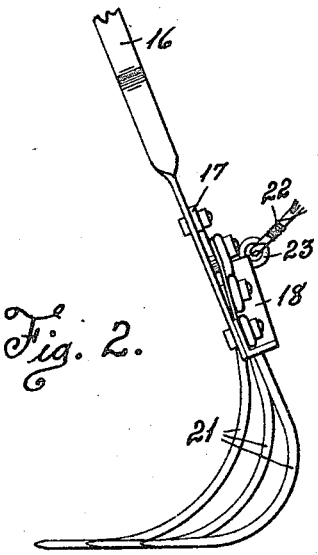
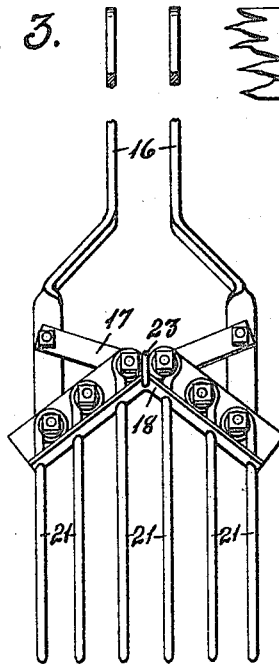
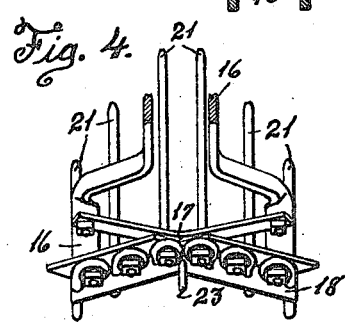
Inventor:
William T. Bird.
By Silas Sweet
Attorney.

Patented Apr. 9, 1929.

1,708,075

UNITED STATES PATENT OFFICE.

WILLIAM T. BIRD, OF SHEFFIELD, IOWA, ASSIGNOR OF ONE-THIRD TO H. L. STEVENS, OF SHEFFIELD, IOWA.

CORN-CULTIVATOR ATTACHMENT.

Application filed August 25, 1927. Serial No. 215,324.

This invention relates to attachments for cultivators and has as an object the provision if an improved cultivator attachment adapted to clear growing crops under cultivation from vines, trash and stubble beyond the reach of the conventional cultivating means.

A further object of the invention is to be found in the provision of improved means for lifting, moving out of the path of cultivator shovels and protecting individual plants of a crop under cultivation.

A further object of the invention is to be found in the provision of improved, adjustable attaching means whereby the improved attachment may be readily adapted to various makes and styles of cultivators.

A further object of the invention is to be found in the provision of means whereby the cultivator attachment may be readily moved to inoperative position at the will of the operator.

My invention consists in the construction, arrangement and combination of elements hereinafter set forth, pointed out in the claims and illustrated by the accompanying drawing, in which—

Figure 1 is a side elevation of a conventional cultivator with the improved attachment in place and ready for practical use, dotted lines indicating the attachment in inoperative position. Figure 2 is a side elevation, on an enlarged scale, of the attachment, certain parts being broken away to conserve space. Figure 3 is a rear elevation of the attachment as shown in Figure 2. Figure 4 is a plan view of the attachment as shown in Figure 2. Figure 5 is a fragmentary detail elevation of the attaching clamp employed to secure the attachment to the cultivator. Figure 6 is a rear elevation of the attaching clamp in position on a cultivator beam or tongue, upper end portions of the attachment being shown in position on said clamp.

In the construction of my improvement as shown, a conventional cultivator is illustrated as having a wheel-supported, upwardly-arched axle 10, a beam or tongue 11 secured at one end to the arch of said axle and extending forwardly therefrom, shovel-supporting cultivator beams 12 pivotally secured at their forward ends to brackets depending from said tongue and handles 13 rising from and for manipulation of said cultivator beams; all of which is common to the art and well known and subject to modification and variation to produce the varying styles, types and makes of cultivators now in general use. It is to be understood that the type of cultivator illustrated is but one of many and that the improved attachment is adapted for use with any such cultivator embodying the broad, general principles of that shown. The improved attachment comprises a clamp member adapted for mounting on the tongue of the cultivator, a main frame hingedly secured to said clamp member and tines carried by said frame. The clamp member consists of two straight, similar bars or straps of metal 14, relatively long and having each a plurality of holes throughout its length, said holes being closely spaced throughout the major portion of the bar and the two holes adjacent one end thereof having a relatively wider spacing. The bars 14 are adapted to be mounted one on either side of the tongue 11, the end hole adjacent the wider spacing being uppermost and projecting above the top of said tongue. Bolts 15 are passed through registering holes in the bars 14, one bolt resting on the top surface of the tongue 11 and the other bolt passing beneath said tongue, and serve to securely clamp the bars 14 against the sides of said tongue, the longer portion of said bars depending below the tongue. A frame is shown composed of similar, opposed side members 16 having registering holes adjacent one end, said side members being disposed in spaced, parallel relation for the major portion of their length, then divergent for a space, whereafter the spaced, parallel relation is resumed, each member 16 being twisted a half turn to bring their wider faces into the same plane, said twisted portions being connected by a rigid brace 17 riveted or bolted at either end thereto. An angle iron 18 is bent to form an angular arch and is mounted on the frame above described with the apex of the arch overlying and bolted to the midportion of the brace 17, end portions of the angle iron bolted to end portions of the side members 16 and the free flange of said angle iron extending at right angles to the members 16 adacent the ends thereof. The frame thus formed is adapted to be hinged to and depend from the clamp member above described, headed pins 19 being passed through the end holes in said frame and opposite holes in the clamp member and retained in the desired position by cotter pins 20. The plurality of holes in the bars 14 provides for vertical adjustment of the frame relative to the cultivator and clamp member and increases the adaptability of the attachment. With the frame mounted as above set forth, the free flange of the angle iron 18 extends rearwardly in a substantially horizontal plane. Spaced holes are formed in said flange and tines or spring fingers 21, each formed with an eye on one end, are mounted through said holes and secured in position by means of bolts passed through said eyes and holes in the vertical flange of the angle iron. As is clearly shown in the drawing, the bolts connecting the angle iron 18 with the brace 17 and side members 16 may serve a double purpose and be used in holding some of the tines 21. The tines 21 are thus mounted to travel in parallel vertical planes, the lower portions thereof being curved forwardly and upwardly to lie in the same horizontal plane, said curvature having varying radii to the end that the center pair of tines is positioned forwardly of the others and has the ends of its tines in advance of the rest and the outer pair of tines is most rearward with the ends of its tines to the rear of the others. A rope, cable or the like, 22, is fastened at one end to a ring or clevis 23 carried by the angle iron 18, the free end of said rope or cable being passed over the axle 10 to a convenient point within the reach of the cultivator operator.

With the attachment assembled and mounted as illustrated and above described, the rope or cable 22 being slack, the weight of the attachment causes it to swing forwardly and downwardly until the forward portions of the tines 21 contact with the ground and it is in position for use. As the cultivator is moved through the field and operated in the usual and customary manner, the attachment moves along the row of plants being cultivated, half of the tines 21 being on either side of said row and when vines are encountered growing on said plants they are lifted by the tines, stripped from the plants and moved outwardly along the tines away from said row. Trash and stubble is moved away from the row in a similar manner. When plants in the row are bent or broken, the tines lift such plants into an erect position and out of the path of the cultivator shovels, thus saving them from damage. Should any fixed obstruction, such as a rock or stump, be encountered, the attachment is free to swing to the rear and pass over the same. When the crop is too high to pass under the attachment, or when turning at the end of a row, the operator may lift the attachment out of operating position by means of the rope or cable 22.

As many changes of structure and arrangement are possible without departing from the spirit of my invention, I wish to be understood as being limited solely by the scope of the appended claims.

I claim as my invention—

1. The combination with a cultivator having a forwardly-extending tongue, of a clamp secured to said tongue, spaced, parallel frame members pivotally secured to and depending from said clamp, an upwardly-arched bar connecting the lower ends of said frame members, spaced tines secured in parallel planes to said bar and manually-operable means for swinging said frame relative to said clamp.

2. The combination with a cultivator having a forwardly-extending tongue, of a clamp secured to said tongue, spaced, parallel frame members adjustably hinged to said clamp and depending therefrom, an upwardly-arched bar connecting the lower ends of said frame members, spaced tines secured in parallel planes to and depending from said bar and manually-operable means for swinging said frame relative to said clamp.

3. The combination with a cultivator having a forwardly-extending tongue, of a clamp secured to said tongue, a frame adjustably hinged to said clamp and depending therefrom, downwardly-extending, forwardly-curved tines spaced in parallel planes transversely of the lower end of said frame, the forward, lower end portions of said tines being parallel with the riding on the surfaces to be cultivated when said frame is in operative position and manually-operable means for swinging said frame relative to said clamp.

4. The combination with a cultivator having a forwardly-extending tongue, of a clamp secured to said tongue, a frame adjustably hinged to said clamp and depending therefrom, downwardly-extending, forwardly-curved tines carried by the lower end of said frame, said tines being spaced in parallel planes transversely of said frame and being curved on arcs of varying radii, the forward, lower end portions of said tines being parallel with and riding on the surface to be cultivated when said frame is in operative position and manually-operable means for swinging said frame relative to said clamp.

5. The combination with a cultivator having a forwardly-extending tongue, of a clamp secured to said tongue, a frame adjustably hinged to said clamp and depending therefrom, an upwardly-arched bar transversely of the lower end of said frame, downwardly-extending, forwardly-curved tines secured in parallel planes to and depending from said bar, said tines being staggered outwardly and rearwardly relative to the median line of said frame, and manually-operable means for swinging said frame relative to said clamp.

6. The combination with a cultivator of a frame hingedly mounted on said cultivator to swing longitudinally of the median line thereof, a combing member on the lower end of said frame, said combing member comprising an upwardly-arched bar transversely of said frame and tines secured in parallel planes to and depending from said bar and manually-operable means for swinging said frame relative to said cultivator.

7. The combination with a cultivator of a frame hingedly mounted on said cultivator to swing longitudinally of the median line thereof, an upwardly-arched bar transversely of the lower end of said frame, downwardly-extending, forwardly-curved tines secured in parallel planes to and depending from said bar, the lower ends of said tines extending forwardly in parallel relation and in engagement with the surface to be cultivated and manually-operable means for swinging said frame relative to said cultivator.

8. The combination with a cultivator of a frame hingedly mounted on said cultivator to swing longitudinally of the median line thereof, downwardly-extending, forwardly-curved tines carried by an upwardly-arched bar transversely of the lower end of said frame, said tines being spaced apart in parallel planes and staggered relative to the median line of said frame, and manually-operable means for swinging said frame relative to said cultivator.

9. A cultivator attachment comprising a clamp member adapted to be secured to a cultivator, a frame adjustably hinged to said clamp member, a combing member comprising an upwardly-arched transverse bar having laterally spaced tines secured thereto carried by the lower end of said frame and means whereby said frame may be swung relative to said clamp member.

10. A cultivator attachment comprising a clamp member adapted to be secured to a cultivator, a frame adjustably hinged to said clamp member, an upwardly-arched bar transversely of the lower end of said frame, downwardly-extending, forwardly-curved tines spaced transversely of said bar and staggered outwardly and rearwardly relative to the median line of said frame, the lower portions of said tines being curved forwardly to extend parallel and in engagement with the surface to be cultivated when said frame is in operative position and means whereby said frame may be swung relative to said clamp member.

Signed at Sheffield, in the county of Franklin and State of Iowa, this 5th day of August, 1927.

WILLIAM T. BIRD.